United States Patent
Joshi et al.

(10) Patent No.: US 11,210,728 B2
(45) Date of Patent: Dec. 28, 2021

(54) SYSTEMS AND METHODS FOR SEARCHING RETAIL PRODUCTS AND LOCATIONS USING A UNIVERSAL SEARCH BAR

(71) Applicant: Walmart Apollo, LLC, Bentonville, AR (US)

(72) Inventors: Prashant H. Joshi, Foster City, CA (US); Seema Chaudhry, Woodside, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/396,417

(22) Filed: Apr. 26, 2019

(65) Prior Publication Data
US 2019/0362413 A1     Nov. 28, 2019

Related U.S. Application Data

(60) Provisional application No. 62/676,632, filed on May 25, 2018.

(51) Int. Cl.
*G06Q 30/00* (2012.01)
*G06Q 30/06* (2012.01)

(52) U.S. Cl.
CPC ..... *G06Q 30/0639* (2013.01); *G06Q 30/0625* (2013.01); *G06Q 30/0641* (2013.01)

(58) Field of Classification Search
CPC ........... G06Q 30/0639; G06Q 30/0625; G06Q 30/0641

(Continued)

(56) References Cited

U.S. PATENT DOCUMENTS 8,190,627 B2   5/2012   Platt
8,676,830 B2   3/2014   Shouvick
(Continued)

FOREIGN PATENT DOCUMENTS

WO     2013043230     3/2013

OTHER PUBLICATIONS

Lewandowski, D., Drechsler, J. and von Mach, S. (2012), Deriving query intents from web search engine queries. J Am Soc Inf Sci Tec, 63: 1773-1788. https://doi.org/10.1002/asi.22706 (Year: 2012).*

(Continued)

*Primary Examiner* — Anand Loharikar
(74) *Attorney, Agent, or Firm* — Fitch, Even, Tabin & Flannery LLP (57) ABSTRACT

In some embodiments, apparatuses and methods are provided herein useful to searching retail products for purchase and locations of physical retail stores. In some embodiments, there is provided a system for searching both retail products for purchase and locations of physical retail stores including a user interface; a memory device; one or more databases; a universal search bar cooperatively operating with the user interface to provide a single search tool for a customer to search the one or more databases storing at least retail product inventories and a plurality of retail locations; and a control circuit configured to: receive a communication signal; autonomously determine a first term associated with the customer; and initiate entry of the first term in the universal search bar to automatically suggest a search term, thereby prompting customer engagement on the user interface.

21 Claims, 3 Drawing Sheets

(58) Field of Classification Search
USPC .................................................. 705/26.1–27.2
See application file for complete search history.

(56) References Cited

U.S. PATENT DOCUMENTS

| | | | |
|---|---|---|---|
| 9,105,029 B2 | 8/2015 | Nuzzi | |
| 9,230,041 B2 | 1/2016 | Lightner | |
| 9,268,857 B2 | 2/2016 | Johnson | |
| 9,449,336 B2 | 9/2016 | Wilson | |
| 9,720,955 B1 | 8/2017 | Cao | |
| 9,852,233 B2 | 12/2017 | Subramanian Karthik | |
| 2002/0161671 A1 | 10/2002 | Matsui | |
| 2005/0216446 A1* | 9/2005 | Hall | G06F 16/3331 |
| 2008/0005047 A1 | 1/2008 | Flake | |
| 2010/0217756 A1* | 8/2010 | Guha | G06F 16/951 |
| | | | 707/706 |
| 2012/0047135 A1 | 2/2012 | Othar | |
| 2013/0018750 A1 | 1/2013 | Winslade | |
| 2013/0073543 A1 | 3/2013 | Nuzzi | |
| 2015/0310120 A1 | 10/2015 | Nuzzi | |
| 2016/0005095 A1* | 1/2016 | Isaacson | G06F 16/248 |
| | | | 705/26.41 |
| 2016/0063599 A1 | 3/2016 | Argue | |
| 2016/0162830 A1 | 6/2016 | Devaiah | |
| 2017/0124634 A1 | 5/2017 | Bal | |
| 2018/0012280 A1 | 1/2018 | Ebenezer | |

OTHER PUBLICATIONS

PCT; App. No. PCT/US2019/032792; International Search Report and Written Opinion dated Jul. 25, 2019.
Wikipedia; "List of Search Engines"; https://en.wikipedia.org/wiki/List_of_search_engines; Available as early as Mar. 14, 2018; pp. 1-15.

* cited by examiner

SYSTEMS AND METHODS FOR SEARCHING RETAIL PRODUCTS AND LOCATIONS USING A UNIVERSAL SEARCH BAR

CROSS-REFERENCE TO RELATED APPLICATION(S)

This application claims the benefit of U.S. Provisional Application No. 62/676,632 filed May 25, 2018, which is incorporated herein by reference in its entirety.

TECHNICAL FIELD

This invention relates generally to enabling customers with access to retail inventory information.

BACKGROUND

Generally, customers like speedy and fast service. The faster a retail store can provide services to customers, the greater likelihood of customer retainment and customer traffic generation.

BRIEF DESCRIPTION OF THE DRAWINGS

Disclosed herein are embodiments of systems, apparatuses and methods pertaining to searching retail products and physical locations of retail stores. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for searching retail products and physical locations of retail stores. In some embodiments, a universal search system for searching both retail products for purchase and locations of physical retail stores to facilitate retail sales and customer pick-up of retail products includes a user interface. By one approach, the user interface is operable on an electronic device associated with a customer. In one configuration, the user interface may facilitate sales transactions between the customer and a retail store associated with the user interface. By another approach, the system may include a memory device. In one configuration, the memory device may store first data associated with the customer and/or second data associated with the electronic device. By another approach, the system may include one or more databases. In one implementation, the one or more databases may store at least retail product inventories and a plurality of retail locations associated with the retail store. By another approach, the system may include a universal search bar. In one configuration, the universal search bar may cooperatively operate with the user interface to provide a single search tool for the customer to search the one or more databases storing at least the retail product inventories and the plurality of retail locations. By yet another approach, the system may include a control circuit. By one approach, the control circuit may operatively couple to the universal search bar, the user interface, the memory device, the one or more databases, and/or the electronic device. In one configuration, the control circuit may receive a communication signal from the electronic device to initiate operation of the user interface with the electronic device. Alternatively or in addition to, the control circuit may, in response to the initiation of the operation, autonomously determine, in cooperation with the memory device and the one or more databases and without user input, a first term associated with the customer. In one example, the first term may include a word, a phrase, a numerical number, and/or a symbol that are associated with the retail product inventories. Alternatively or in addition to, the control circuit may, in response to the initiation of the operation of the user interface and prior to a receipt of an initial input from the customer through the user interface, initiate entry of the first term in the universal search bar to automatically suggest a search term, thereby prompting customer engagement on the user interface.

In some embodiments, a universal search system for searching both retail products for purchase and locations of physical retail stores to facilitate retail sales and customer pick-up of retail products includes a user interface. By one approach, the user interface may be operable on an electronic device associated with a customer. In one example, the user interface may facilitate sales transactions between the customer and a retail store associated with the user interface. By another approach, the system may include a universal search bar. In one implementation, the universal search bar may cooperatively operate with the user interface to provide a single search tool for the customer to search one or more databases storing at least retail product inventories and a plurality of retail locations associated with the retail store. By another approach, the system may include a control circuit. By one approach, the control circuit may operatively couple to the universal search bar and the user interface. In such an approach, the control circuit may receive a communication signal from the electronic device to initiate operation of the user interface with the electronic device. Alternatively or in addition to, the control circuit may, subsequent to the initiation of the operation of the user interface, receive an input from the customer through an entry of a term in the universal search bar. In one example, the term may include a city, a state, a zip code, and/or a country. Alternatively or in addition to, the control circuit may, in response to the entry, initiate display on the user interface of one or more retail locations of the plurality of retail locations. In one example, the one or more retail locations may be associated with the term.

In some embodiments, a method for searching both retail products for purchase and locations of physical retail stores using a universal search system to facilitate retail sales and customer pick-up of retail products includes receiving, at a control circuit, a communication signal from an electronic device to initiate operation of a user interface operable on the electronic device associated with a customer. In one example, the user interface may facilitate sales transactions between the customer and a retail store associated with the user interface. By one approach, the method may include, in response to the initiation of the operation, autonomously determining, by the control circuit in cooperation with a memory device and one or more databases and without user input, a first term associated with the customer. In one example, the first term may include a word, a phrase, a numerical number, and/or a symbol that are associated with retail product inventories. Alternatively or in addition to, the method may include, in response to the initiation of the operation of the user interface and prior to receiving an initial input from the customer through the user interface, initiating entry of the first term in a universal search bar to automatically suggest a search term, thereby prompting customer engagement on the user interface. In one example, the universal search bar in cooperation with the user interface may provide a single search tool for the customer to search the one or more databases storing at least the retail product inventories and a plurality of retail locations associated with the retail store.

Figure 1:
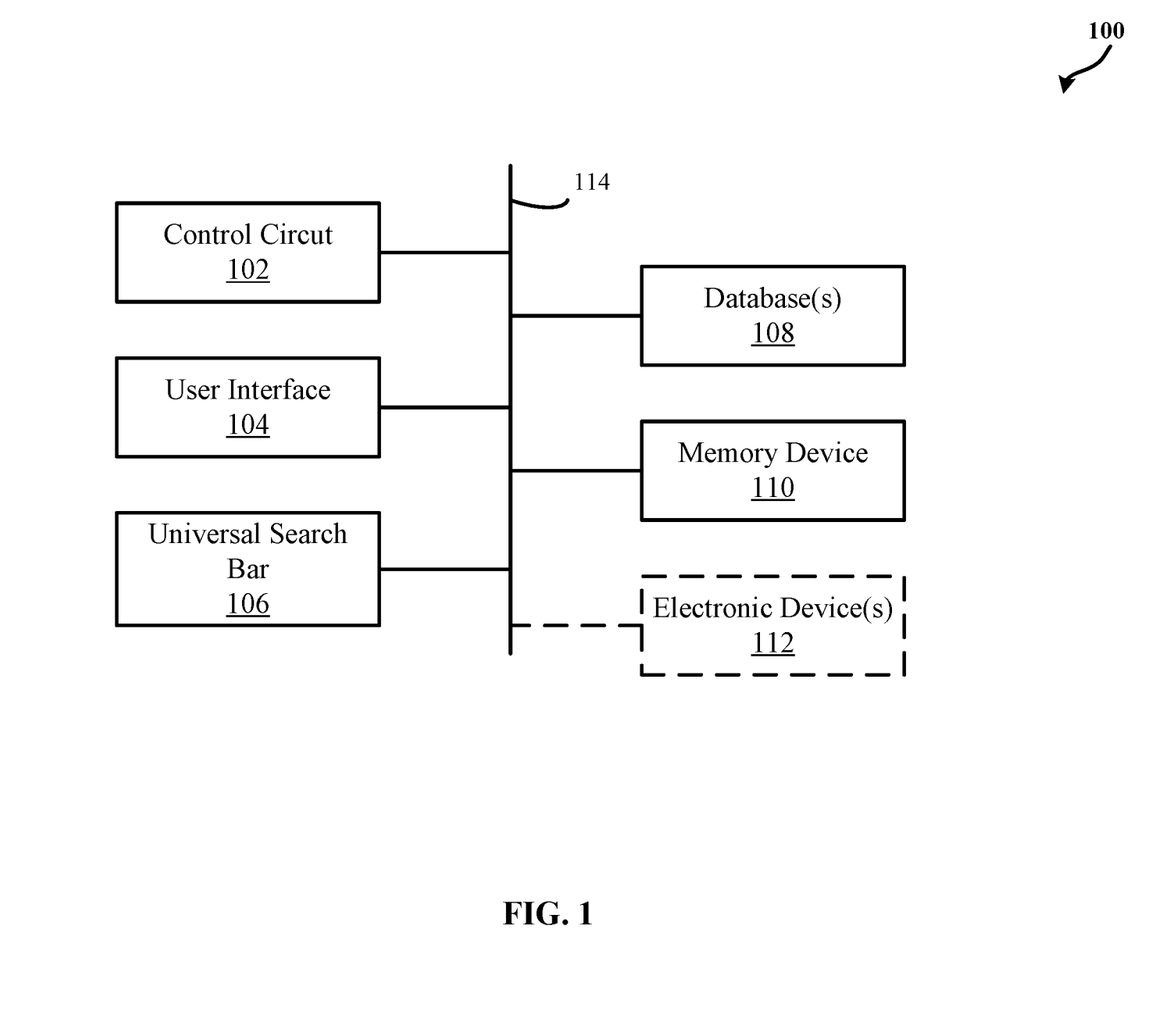
FIG. 1 illustrates a simplified block diagram of an exemplary system for searching retail products and physical locations of retail stores in accordance with some embodiments.

FIG. 1 illustrates a simplified block diagram of an exemplary system 100 that searches both retail products for purchase and physical locations of retail stores to facilitate retail sales and customer pick-up of retail products. The system 100 includes a user interface 104 operable on at least one electronic device 112 associated with a customer. By one approach, the user interface 104 may be operable on a plurality of electronic devices 112 associated with a plurality of customers. In some configurations, the user interface 104 may detachably couple to the electronic device 112. For example, the user interface 104 may be a portable electronic device configured to attach and/or wirelessly couple with the electronic device 112. In some other configurations, the user interface 104 may correspond to a computer program product embodied on a computer readable storage medium, such as a Read Only Memory (ROM), a Random Access Memory (RAM), an Erasable Programmable ROM (EPROM), and/or the likes. In such configuration, the user interface 104 may be executable by the electronic device 112. In one example, the electronic device 112 may include a smartphone, a computer, a server, a laptop, a smartwatch, and/or the likes. For example, the user interface 104 may be an APP executed on an electronic device 112 providing a graphical user interface displayed on a display of the electronic device 112 allowing the customer to interact with the graphical user interface through the user inputs, user output and other such interface provided by the electronic device 112 (e.g., touch screen, buttons, voice recognition, detected predefine movements, mouse, keyboard, etc.).

In one configuration, the system 100 may include a universal search bar 106. By one approach, the universal search bar 106 may correspond to a computer program product embodied on a computer readable storage medium, such as a ROM, a RAM, an EPROM, and/or the likes. In such a configuration, the universal search bar 106 may cooperatively operate with the user interface 104. In one example, the universal search bar 106 may be integrated with and/or cooperatively executable with the user interface 104. In one scenario, when a customer initiates operation of the user interface 104, the universal search bar 106 may be concurrently initiated with the user interface 104. For example, the universal search bar 106 may be displayed on a graphical user interface displayed by the user interface 104 on a display of the electronic device 112. Alternatively or in addition to, when a first computer program product corresponding to the user interface 104 is initiated, a second computer program product corresponding to the universal search bar 106 may be subsequently initiated prior to a graphical user interface displayed by the user interface 104 is displayed on a display of the electronic device 112. In another configuration, the system 100 may include a memory device 110. By one approach, the memory device 110 may comprise a ROM, a RAM, an EPROM, and/or the likes. In one example, the memory device 110 may be a standalone electronic device accessible through a communication network 114 by one or more electronic devices 112. In one configuration, the communication network 114 may include wired network, wireless network, Internet, WiFi network, among other types of communication network that facilitates communications between electronic devices. In another example, the electronic device 112 may include the memory device 110. In some implementations, the system 100 may include one or more databases 108. By one approach, the one or more databases 108 may be accessible through the communication network 114. By another approach, the one or more databases 108 may include one or more servers configured to interact with end-users, applications, and/or other databases to capture, analyze, store, and/or organize data to provide retrieval by electronic devices 112. In some implementations, the system 100 may include a control circuit 102. By one approach, the control circuit 102 may be operatively coupled to the universal search bar 106, the user interface 104, the memory device 110, the one or more databases 108, and/or the electronic device 112. In one configuration, the control circuit 102 may be operatively coupled to at least one of the universal search bar 106, the user interface 104, the memory device 110, the one or more databases 108, and/or the electronic device 112 via the communication network 114.

In an illustrative non-limiting example, the user interface 104 may facilitate sales transactions between one or more customers and a retail store associated with the user interface 104. Alternatively or in addition to, the user interface 104 may facilitate customer shopping of retail products associated with the retail store and/or determination of physical locations of the retail stores. For example, the electronic device 112 may provide a communication signal to the control circuit 102 based on an input from a customer through the electronic device 112. In one configuration, the control circuit 102 may receive the communication signal to initiate operation of the user interface 104 with the electronic device 112. In another configuration, the control circuit 102 may autonomously determine, in cooperation with the memory device 110 and the one or more databases 108 and without user input, a first term associated with the customer in response to the initiation of the operation of the user interface 104. By one approach, an initiation of the operation of the user interface 104 may correspond to causing an activation and/or an execution of the user interface 104.

For example, the memory device 110 may store first data associated with the customer and/or second data associated with the electronic device 112. In one scenario, the first data associated with the customer may include a user profile of the customer, web cookies associated with the customer, browsing history of the customer, a listing of one or more retail products in a shopping cart associated with the customer through the user interface 104, purchase history of the customer, other such information, or a combination of two or more of such information. In another scenario, the second data associated with the electronic device 112 may include location data associated with the electronic device 112 at a time communication signal is received by the control circuit 102, direction of movement, duration and/or speed of movement, historic movement information, route information, intended destination information, device identifier information, version information, customer identifier information, security access information, other such information, or a combination of two or more of such information. For example, the location data may include navigation data provided by a receiver associated with Global Positioning Satellite, Global Navigation Satellite System (GNSS), and the like. In another example, the location data may further include weather information associated with the navigation data. In one scenario, the control circuit 102 may access a weather database and determine a particular weather information of a location corresponding to the navigation data. In another example, the first term autonomously determined by the control circuit 102 may have a particular relation, a particular significance, and/or closer degree of affinity to the customer relative to another customer. In an illustrative non-limiting example, based on a user profile associated with the customer indicating that the customer wears a large size clothing and/or the location data provided by the receiver of the electronic device 112 carried by the customer corresponds to Chicago, Ill. during a time that the forecast is cold and breezy, the control circuit 102 may autonomously determine a first term corresponding to the words "large jacket". In an example, a first term may include a word, a phrase, a numerical number, and/or a symbol that are associated with retail product inventories of a retail store. In another illustrative non-limiting example, based on a shopping cart associated with the customer through the user interface 104, the control circuit 102 may autonomously determine a first term corresponding to the phrase "3 pounds of oranges". By one approach, a graphical user interface displayed by the user interface 104 may include a virtual shopping cart configured to hold a listing of one or more retail inventories selected by the customer and identified as retail products the customer is interested in purchasing.

Alternatively or in addition to, in response to the initiation of the operation of the user interface 104 and prior to a receipt of an initial input from the customer through the user interface 104, the user interface can be configured to initiate entry of a first term in the universal search bar 106 to automatically suggest a search term, thereby prompting customer engagement on the user interface 104. In continuing the illustrative non-limiting example above, when the customer electronically connects to a retail online site, a first term (e.g., the large jacket or the 3 pounds of oranges) is shown by the control circuit 102 on the universal search bar 106 of the retail online site. The first term is shown by the control circuit 102 without the customer initiating a user input or prior to any user entry and/or active engagement by the customer with the retail online site. Since the first term that is automatically shown in the universal search bar 106 has a particular relationship, significance, and/or degree of affinity to the customer, the control circuit 102 quickly and/or proactively engages the customer to interact with the retail online site. As such, the system 100 and/or the control circuit 102, in an unconventional way, proactively prompts customers to actively engage the retail online site to initiate a purchase and/or encourage a purchase as opposed to the conventional and widely known way of waiting for a customer to make an initial entry in a search bar before initiating a search based on the user entered term associated with the customer's initial entry. Thus, the system 100 and/or the control circuit 102 improves upon the conventional way of waiting first for a customer to make an entry in the search bar before entering a term associated with the entry by unconventionally applying rules in filtering thousands of potential search terms based on information specifically relevant to the customer to select one or more search terms with high relevance to the customer and prompting customers to engage the retail online site through autonomously entering and/or showing a first term without user input that has a particular relationship, a particular significance, and/or within a threshold of degree of affinity to the customer.

Alternatively or in addition to, the control circuit 102 may receive a subsequent initial input from the customer after a first term is autonomously filtered, identified and shown and/or entered by the control circuit 102 in the universal search bar 106. By one approach, the initial input may be a confirmation from the customer to search the first term. In one configuration, the control circuit 102 may autonomously determine one or more second terms in response to initiating the search of the one or more databases 108 based on the first term. For example, the control circuit 102 may access the one or more databases 108 to determine a second term that is associated with the first term. In one scenario, if the first term is the word "flowers", the control circuit 102 may determine that an associated second term may include tulips, roses, among other types of flowers. As such, the second term may be determined by identifying a category that the first term is associated with via an access to one of the databases 108 by the control circuit 102. Additionally, the control circuit 102 may determine one or more retail products associated with the category based on an access to one of the databases 108 storing retail product inventories sold by a retail store associated with the user interface 104. Thus, a set of filtering rules limit searches to available and/or sold retail inventory corresponding to the first term and relevant to the customer based on preferences, purchase history, user profile, browsing history, current location of the customer, and/or the like. By one approach, the second term may include a listing and/or a graphical and/or a photograph showing of inventories sold and/or available at the retail store, where the inventories are associated with the first term. In such an approach, the control circuit 102 may initiate display on the user interface 104 of one or more second terms associated with the first term. In an illustrative non-limiting example, the one or more second terms may be displayed proximate the first term, replace the first term, and/or listed in order of relevance to the customer. For example, the one or more second terms may include at least one of: a word, a phrase, a numerical number, and a symbol that are associated with retail product inventories.

In some embodiments, the first term may be determined by the control circuit 102 based on a set of rules, such as a hierarchical scheme of degree of affinity to a customer associated with the electronic device 112. By one approach, the hierarchical scheme of degree of affinity may include the first data associated with the customer, the second data associated with the electronic device 112, and/or one or more events associated at a time a communication signal is received from the electronic device 112. In one configuration, the one or more events may include a festivity, a local emergency, and/or high demand regional trends for one or more of retail product inventories. By one approach, the festivity may include a holiday associated with the time the communication signal is received by the control circuit 102 and/or a special occasion based on a user profile of a customer. For example, in the hierarchical scheme of degree of affinity, the control circuit 102 may first determine a set of terms based on the closest degree of affinity to the customer and subsequently determines a smaller set of terms from the set of terms based on the next closest degree of affinity to the customer. As such, the control circuit 102 may determine the first term from a last set of terms from a subsequent set of terms based on a last closest degree of affinity to the customer (i.e., the farthest and/or remote degree of affinity to the customer). In an illustrative non-limiting example, based on a previous browsing history of a customer, the control circuit 102 may determine that a word "anniversary" has been searched by the customer a number of times. In response, the control circuit 102 may determine a set of terms including rings, flowers, restaurants, and resorts based on the word "anniversary", for example. Alternatively or in addition to, the control circuit 102 may subsequently determine a smaller set of terms from the set of terms based on the customer's user profile (e.g., browsing history is the closest degree of affinity to the customer while the user profile is the next closest degree of affinity to the customer). For example, the smaller set of terms may include tulips, roses, anemones, lilies, and hydrangeas (e.g., types of flowers that are sold and/or available at the retail store) based on a determination by the control circuit 102, via an access to the user profile associated with the customer, that the customer had previously bought flowers.

In another example, in the hierarchical scheme of degree of affinity, when the control circuit 102 determines that the first term could not be determined based on the closest degree of affinity to the customer, the control circuit 102 may subsequently determine the first term based on the next closest degree of affinity to the customer. In another example, from closest degree of affinity to least closest degree of affinity to the customer, the hierarchical scheme of degree of affinity may include first data associated with a customer, second data associated with the electronic device 112, and one or more events associated at a time a communication signal is received from the electronic device 112. As such, when a first determination of the first term is based at least in part on the first data, the first determination may provide a closest degree of affinity to the customer indicating that the first term, when searched, may provide a first search result that is of a highest relevance to the customer relative to a second search result based on the first term being determined based on the other ones in the hierarchical scheme.

In some embodiments, the control circuit 102 may receive a second input from the customer through a second entry of a second term in the universal search bar 106 by the customer. By one approach, the second term may include a city, a state, a zip code, and/or a country. Alternatively or in addition to, the second term may be autonomously determined by the control circuit 102 based on the location data provided by the electronic device 112 and autonomously entered by the control circuit 102 in the universal search bar 106, for example. In such an example, the second input from the customer may correspond to a selection of the second term that is autonomously determined and entered by the control circuit 102 in the universal search bar 106.

Alternatively or in addition to, the control circuit 102 may initiate display on the user interface 104 of one or more retail locations of a plurality of retail locations. In one configuration, the one or more retail locations may be associated with the second term input by the customer in the universal search bar 106. As such, the universal search bar 106 provides a single search tool for a customer to search the one or more databases 108 storing at least retail product inventories and a plurality of retail locations. For example, the retail product inventories may include inventories of retail products for sale and/or available for sale by the retail store while the plurality of retail locations may include physical locations and/or addresses of various storefronts of the retail store.

Continuing the illustrative non-limiting example above, instead of accepting the autonomously determined first entry shown and/or entered by the control circuit 102 in the universal search bar 106, the customer may provide an alternate initial input corresponding to a second entry that replaces the first entry in the universal search bar 106. In another example, the customer may provide a subsequent input corresponding to a subsequent entry in the universal search bar 106. In yet another example, subsequent to an initiation of an operation of the user interface 104, the control circuit 102 may receive an input from the customer through an entry of a term in the universal search bar 106, where the term may include a city, a state, a zip code, and/or a country. Continuing the illustrative non-limiting example above, the customer may enter in the universal search bar 106 the zip code "90210". In response to the entry of the zip code 90210 in the universal search bar 106, the control circuit 102 may initiate display on the user interface 104 of one or more locations of the retail store that are within a distance threshold of the zip code 90210. As such, when the customer enters a city, a state, a zip code, and/or a country in the universal search bar 106, the control circuit 102 may determine one or more physical locations of the retail store that are within a distance threshold of the city, the state, the zip code, and/or the country entered by the customer in the universal search bar 106. By one approach, the control circuit 102 may initiate display on the user interface 104 of the determined one or more physical locations of the retail store.

Alternatively or in addition to, in response to the display of the determined one or more physical locations of the retail store, the control circuit 102 may receive a third input from the customer through a selection of one of the displayed one or more retail locations. Alternatively or in addition to, the control circuit 102 may initiate display on the user interface 104 of information associated with the selected one of the displayed one or more retail locations. For example, the information may include one or more phone numbers, service hours, distance from the customer of the selected one of the displayed one or more retail locations, among other information that may be associated with the retail store at the selected retail location. Alternatively or in addition to, the control circuit 102 may receive a fourth input from the customer through a save selection on the user interface 104. By one approach, the control circuit 102 may, in response to the receipt of the fourth input, initiate association of the information with a transaction associated with the customer. For example, the selected retail location may be saved and/or associated with a user profile of the customer and/or a particular transaction queued at a shopping cart associated with the user interface 104. Thus, the universal search bar 106 unconventionally serves as the only search bar used by a customer to search for retail products and/or physical locations of a retail store when the customer is engaged with a retail online site. As such, the universal search bar 106 in cooperation with the control circuit 102 improves upon the conventional way of a customer stepping through multiple steps (e.g., a customer determining where is the "Find Store" link in the retail online site, clicking on the "Find Store" link, finding a search bar to enter the zip code, city, or state, entering either the zip, city, or state, and clicking on "search") in order to search for one or more physical locations of the retail store by reducing and/or eliminating a number of steps the customer does to search for the physical locations of the retail store. For example, contrary to the conventional way, the universal search bar 106 reduces the steps to including at least entering, by a customer and/or the control circuit 102, the zip code, city, state, and/or country in the universal search bar 106 and a customer input selecting and/or acknowledging the term entered in the universal search bar 106. As a result, through the use of the universal search bar 106, the control circuit 102 and/or the system 100 enables the customer to save and/or efficiently use the customer's time while the customer is engaged with the retail online site.

Figure 2:
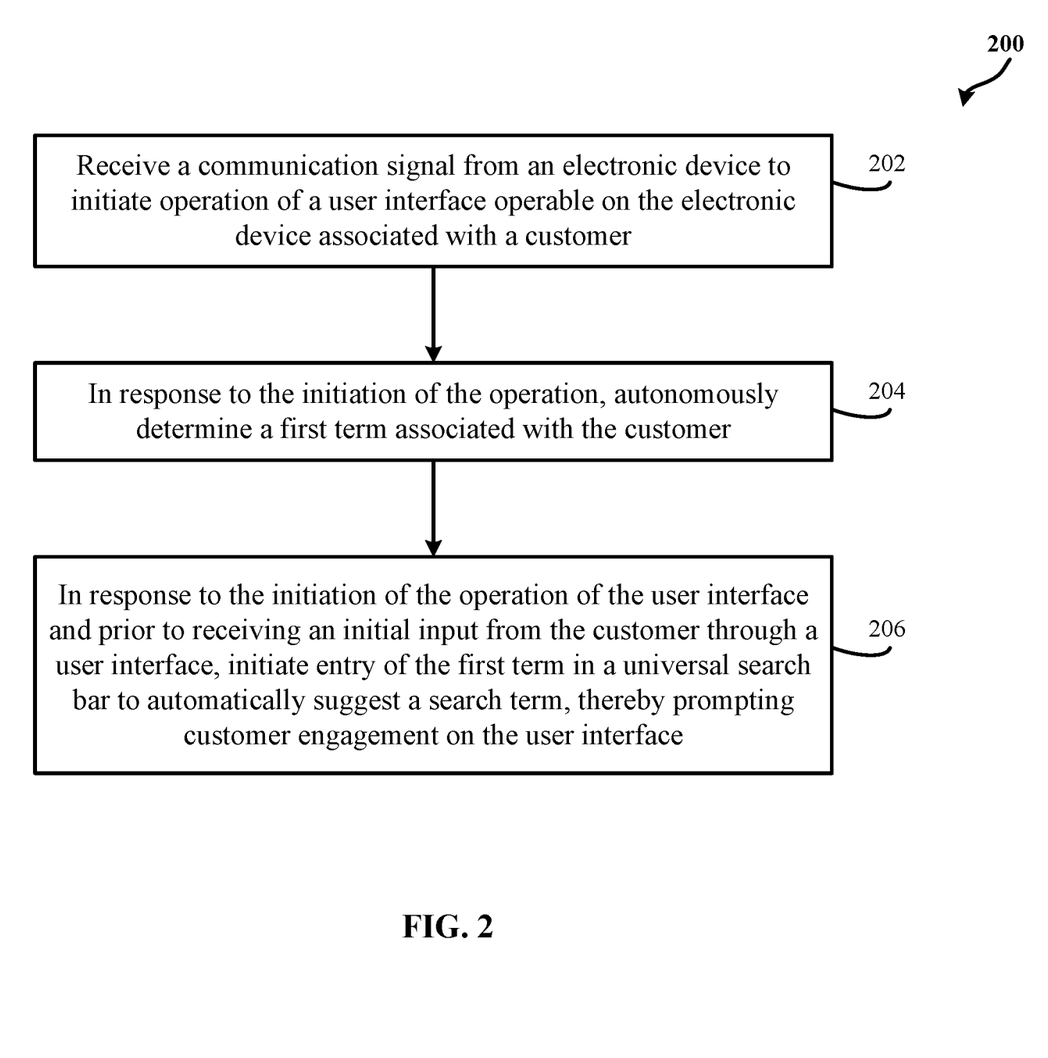
FIG. 2 shows a flow diagram of an exemplary process of searching retail products and physical locations of retail stores in accordance with some embodiments.

FIG. 2 illustrates a flow diagram of an exemplary method 200 for searching retail products and physical locations of retail stores. The exemplary method 200 may be implemented in the system 100 of FIG. 1. One or more steps in the method 200 may be implemented in the control circuit 102, the user interface 104, the universal search bar 106, the memory device 110, the databases 108, and/or the electronic devices 112. The method 200 includes, at step 202, receiving, at a control circuit, a communication signal from an electronic device to initiate operation of a user interface operable on the electronic device associated with a customer. By one approach, the user interface may facilitate sales transactions between the customer and a retail store associated with the user interface. In one configuration, the method 200 may include, at step 204, in response to the initiation of the operation, autonomously determining, by the control circuit in cooperation with a memory device and one or more databases and without user input, a first term associated with the customer. For example, the first term may include at least one of: a word, a phrase, a numerical number, and a symbol that are associated with retail product inventories. Alternatively or in addition to, the method 200 may include, at step 206, in response to the initiation of the operation of the user interface and prior to receiving an initial input from the customer through the user interface, initiating entry of the first term in a universal search bar to automatically suggest a search term, thereby prompting customer engagement on the user interface. As such, the universal search bar in cooperation with the user interface provides a single search tool for the customer to search the one or more databases storing at least the retail product inventories and a plurality of retail locations associated with the retail store.

In some embodiments, the method 200 may include receiving, at the control circuit, the initial input from the customer. For example, the initial input may correspond to a confirmation from the customer to search the first term. By one approach, the method 200 may include initiating, by the control circuit, display on the user interface of one or more second terms associated with the first term. For example, the one or more second terms may include at least one of: one or more words, one or more phrases, one or more numerical numbers, and one or more symbols that are associated with retail product inventories. Alternatively or in addition to, the method 200 may include receiving, at the control circuit, a second input from the customer through a second entry of a second term in the universal search bar by the customer. For example, the second term may include at least one of: a city, a state, a zip code, and a country. By one approach, the method 200 may include initiating, by the control circuit, display on the user interface of one or more retail locations of the plurality of retail locations. For example, the one or more retail locations may be associated with the second term in the universal search bar. Alternatively or in addition to, the method 200 may include receiving, at the control circuit, a third input from the customer through a selection of one of the one or more retail locations. In one configuration, the method 200 may include initiating, by the control circuit, display on the user interface of information associated with the selected one of the one or more retail locations. By one approach, the method 200 may include receiving, at the control circuit, a fourth input from the customer through a store selection on the user interface. Alternatively or in addition to, the method 200 may include, in response to the receipt of the fourth input, initiating association of the information with an electronic transaction associated with the customer.

Figure 3:
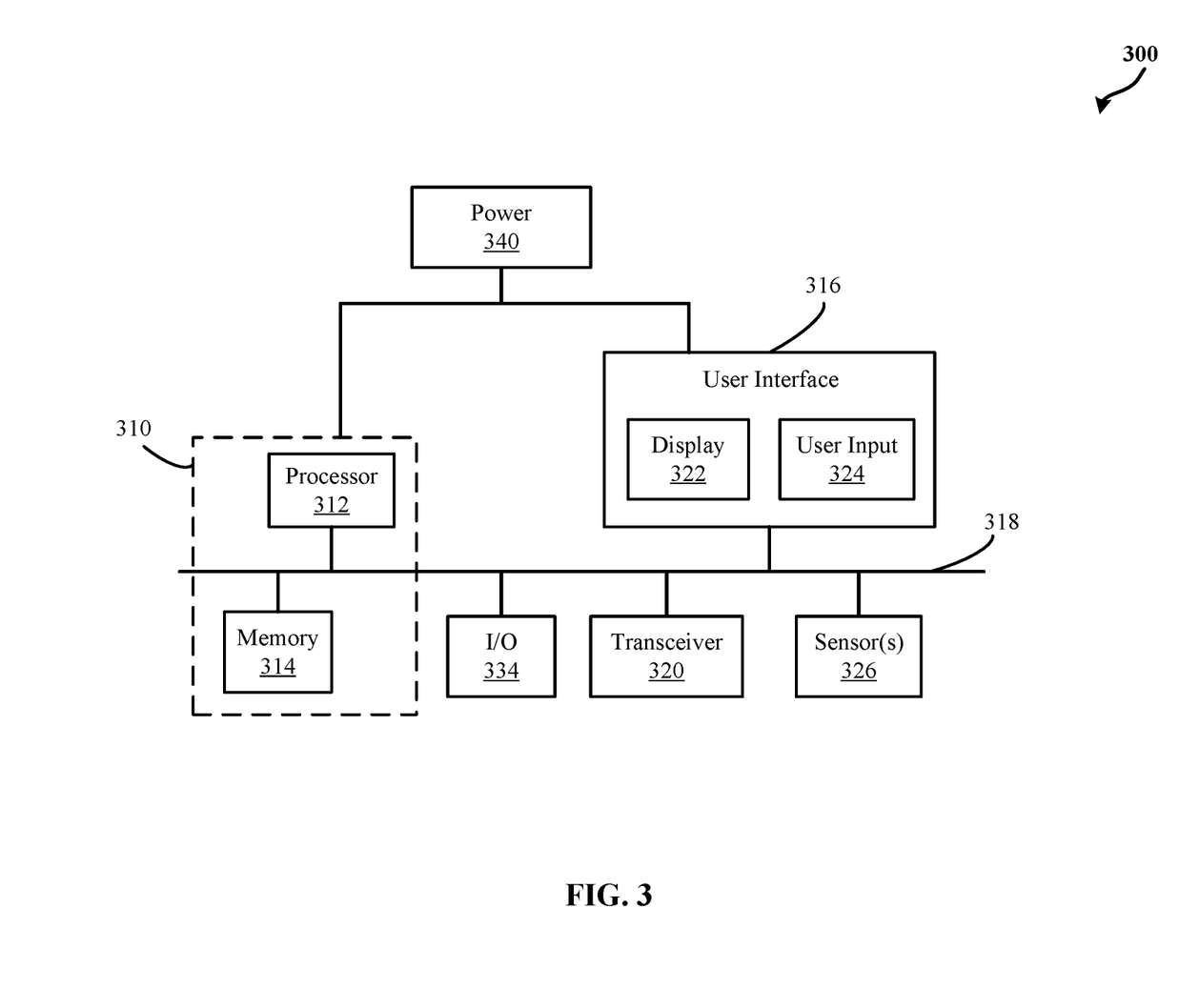
FIG. 3 illustrates an exemplary system for use in implementing methods, techniques, devices, apparatuses, systems, servers, sources and searching retail products and physical locations of retail stores, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 3 illustrates an exemplary system 300 that may be used for implementing any of the components, circuits, circuitry, systems, functionality, apparatuses, processes, or devices of the system 100 of FIG. 1, the method 200 of FIG. 2, and/or other above or below mentioned systems or devices, or parts of such circuits, circuitry, functionality, systems, apparatuses, processes, or devices. For example, the system 300 may be used to implement some or all of the system 100 of FIG. 1 for searching both retail products for purchase and locations of physical retail stores, the control circuit 102, the user interface 104, the universal search bar 106, the memory device 110, the databases 108, the electronic devices 112, and/or other such components, circuitry, functionality and/or devices. However, the use of the system 300 or any portion thereof is certainly not required.

By way of example, the system 300 may comprise a processor module (or a control circuit) 312, memory 314, and one or more communication links, paths, buses or the like 318. Some embodiments may include one or more user interfaces 316, and/or one or more internal and/or external power sources or supplies 340. The control circuit 312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 312 can be part of control circuitry and/or a control system 310, which may be implemented through one or more processors with access to one or more memory 314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 300 may be used to implement one or more of the above or below, or parts of, components, circuits, systems, processes and the like. For example, the system 300 may implement the system 100 for searching both retail products for purchase and locations of physical retail stores with the control circuit 102 being the control circuit 312.

The user interface 316 can allow a user to interact with the system 300 and receive information through the system. In some instances, the user interface 316 includes a display 322 and/or one or more user inputs 324, such as buttons, touch screen, track ball, keyboard, mouse, etc., which can be part of or wired or wirelessly coupled with the system 300. Typically, the system 300 further includes one or more communication interfaces, ports, transceivers 320 and the like allowing the system 300 to communicate over a communication bus, a distributed computer and/or communication network (e.g., a local area network (LAN), the Internet, wide area network (WAN), etc.), communication link 318, other networks or communication channels with other devices and/or other such communications or combination of two or more of such communication methods. Further the transceiver 320 can be configured for wired, wireless, optical, fiber optical cable, satellite, or other such communication configurations or combinations of two or more of such communications. Some embodiments include one or more input/output (I/O) interface 334 that allow one or more devices to couple with the system 300. The I/O interface can be substantially any relevant port or combinations of ports, such as but not limited to USB, Ethernet, or other such ports. The I/O interface 334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 326 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 300 comprises an example of a control and/or processor-based system with the control circuit 312. Again, the control circuit 312 can be implemented through one or more processors, controllers, central processing units, logic, software and the like. Further, in some implementations the control circuit 312 may provide multiprocessor functionality.

The memory 314, which can be accessed by the control circuit 312, typically includes one or more processor readable and/or computer readable media accessed by at least the control circuit 312, and can include volatile and/or nonvolatile media, such as RAM, ROM, EEPROM, flash memory and/or other memory technology. Further, the memory 314 is shown as internal to the control system 310; however, the memory 314 can be internal, external or a combination of internal and external memory. Similarly, some or all of the memory 314 can be internal, external or a combination of internal and external memory of the control circuit 312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 314 can store code, software, executables, scripts, data, content, lists, programming, programs, log or history data, user information, customer information, product information, and the like. While FIG. 3 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A universal search system operable within a single retailer for searching both retail products for purchase and retail locations of the physical retail stores of the single retailer to facilitate retail sales and customer pick-up of the retail products comprising:

a universal search bar of a user interface associated with and operable within the single retailer to provide a single search tool configured to enable a customer to search one or more databases of the single retailer for at least retail product inventories available at the single retailer and a plurality of the retail locations of the single retailer, wherein a control circuit associates a search term in the universal search bar as being either associated with the retail product inventories or the plurality of the retail locations and searches the one or more databases accordingly, wherein the single retailer comprises the physical retail stores associated with the single retailer;

the control circuit operatively coupled to the universal search bar, the user interface, a memory device, the one or more databases, and an electronic device associated with the customer, the control circuit configured to:

receive a communication signal from the electronic device to initiate operation of the user interface with the electronic device;

in response to the initiation of the operation, autonomously determine, in cooperation with the memory device and the one or more databases and without user input, a first term associated with the customer based on data obtained from the customer in one or more categories of relevance to the customer, wherein the first term comprises at least one of: a word, a phrase, a numerical number, and a symbol that are associated with the retail product inventories; and in response to the initiation of the operation of the user interface and prior to a receipt of an initial input from the customer through the user interface, cause the user interface operable on the electronic device to initiate entry of the first term in the universal search bar of a graphical user interface displayed on the electronic device to automatically suggest the search term, wherein a display of the electronic device is configured to display the first term in the universal search bar after the initiation of the operation of the user interface and prior to the receipt of the initial input from the customer, thereby prompting the customer to engage on the user interface;

the user interface of the single retailer operable on the electronic device and configured to facilitate sales transactions between the customer and the single retailer;

the memory device configured to store at least one of: first data associated with the customer and second data associated with the electronic device; and the one or more databases of the single retailer configured to store at least both the retail product inventories and the plurality of the retail locations of the single retailer.

2. The universal search system of claim 1, wherein the one or more categories of relevance corresponds to a hierarchical scheme of degree of affinity to the customer comprising at least one of: the first data associated with the customer, the second data associated with the electronic device, and one or more events associated at a time the communication signal is received from the electronic device, wherein the one or more events comprises a festivity, a local emergency, and high demand regional trends for one or more of the retail product inventories, and wherein, when a first determination of the first term is based at least in part on the first data, the first determination provides a closest degree of affinity to the customer indicating that the first term, when searched, provides a first search result with a highest relevance to the customer relative to a second search result based on the first term being determined based on the other ones in the hierarchical scheme.

3. The universal search system of claim 2, wherein the first data associated with the customer comprises at least one of: a user profile of the customer, web cookies associated with the customer, browsing history of the customer, and a listing of one or more retail products in a shopping cart associated with the customer on the user interface, wherein the second data associated with the electronic device comprises location data associated with the electronic device at the time the receipt of the communication signal by the control circuit, and wherein the festivity comprises at least one of: a holiday associated with the time the communication signal is received by the control circuit and a special occasion based on a user profile of the customer.

4. The universal search system of claim 1, wherein the control circuit is further configured to cause the user interface to display proximate the first term in the universal search bar a listing of photographic inventories associated with the first term and available at the single retailer in response to the initial input from the customer.

5. The universal search system of claim 1, wherein the control circuit is further configured to:
receive from the electronic device the initial input from the customer via the graphical user interface shown on the display, wherein the initial input is a confirmation from the customer to search the first term;
autonomously determine one or more second terms in response to initiating the search of the one or more databases based on the first term; and
initiate display on the graphical user interface of the one or more second terms associated with the first term, wherein the one or more second terms comprise at least one of: a word, a phrase, a numerical number, and a symbol that are associated with retail product inventories.

6. The universal search system of claim 1, wherein the control circuit is further configured to:
receive a second input from the customer through a second entry of a second term in the universal search bar by the customer, wherein the second term comprises at least one of: a city, a state, a zip code, and a country; and
initiate display on the user interface of one or more retail locations of the plurality of the retail locations, wherein the one or more retail locations are associated with the second term in the universal search bar.

7. The universal search system of claim 6, wherein the second input may correspond to the initial input from the customer, and wherein the second entry replaces the entry of the first term.

8. The universal search system of claim 6, wherein the control circuit is further configured to:
receive a third input from the customer through a selection of one of the displayed one or more retail locations; and
initiate display on the user interface of information associated with the selected one of the displayed one or more retail locations.

9. The universal search system of claim 8, wherein the control circuit is further configured to:
receive a fourth input from the customer through a save selection on the user interface; and
in response to the receipt of the fourth input, initiate association of the information with a transaction associated with the customer.

10. A method for searching both retail products for purchase and retail locations of physical retail stores of a single retailer using a universal search system operable within the single retailer to facilitate retail sales and customer pick-up of the retail products comprising:
receiving, at a control circuit, a communication signal from an electronic device to initiate operation of a user interface of the single retailer, the user interface operable on the electronic device associated with a customer, wherein the user interface is configured to facilitate sales transactions between the customer and the single retailer;
in response to the initiation of the operation, autonomously determining, by the control circuit in cooperation with a memory device and one or more databases of the single retailer and without user input, a first term associated with the customer based on data obtained from the customer in one or more categories of relevance to the customer, wherein the first term comprises at least one of: a word, a phrase, a numerical number, and a symbol that are associated with retail product inventories available at the single retailer;
in response to the initiation of the operation of the user interface and prior to receiving an initial input from the customer through the user interface, causing the user interface operable on the electronic device to initiate entry of the first term in a universal search bar of a graphical user interface of the user interface displayed on the electronic device to automatically suggest a search term, wherein the control circuit correspondingly associates the search term in the universal search bar of the user interface as being either associated with the retail product inventories or a plurality of the retail locations of the physical retail stores and searches the one or more databases accordingly; and displaying after the initiation of the operation of the user interface and prior to receiving the initial input from the customer, at a display of the electronic device, the first term in the universal search bar of the graphical user interface shown on the display, thereby prompting the customer to engage on the user interface, wherein the universal search bar is operable within the single retailer and configured to provide a single search tool that enables the customer to search the one or more databases for at least the retail product inventories and the plurality of the retail locations of the single retailer, wherein the one or more databases stores at least both the retail product inventories and the plurality of the retail locations of the single retailer.

11. The method of claim 10, wherein the one or more categories of relevance corresponds to a hierarchical scheme of degree of affinity to the customer comprising at least one of: first data associated with the customer, second data associated with the electronic device, and one or more events associated at a time the communication signal is received by the control circuit, wherein the one or more events comprises a festivity, a local emergency, and high demand regional trends for one or more of the retail product inventories, and wherein, when a first determination of the first term is based at least in part on the first data, the first determination provides a closest degree of affinity to the customer indicating that the first term, when searched, provides a first search result with a highest relevance to the customer relative to a second search result based on the first term being determined based on the other ones in the hierarchical scheme.

12. The method of claim 11, wherein the first data associated with the customer comprises at least one of: a user profile of the customer, web cookies associated with the customer, browsing history of the customer, and a listing of one or more retail products in a shopping cart associated with the customer on the user interface, wherein the second data associated with the electronic device comprises location data associated with the electronic device at the time the receipt of the communication signal by the control circuit, and wherein the festivity comprises at least one of: a holiday associated with the time the communication signal is received by the control circuit and a special occasion based on a user profile of the customer.

13. The method of claim 10, further comprising causing the user interface to display proximate the first term in the universal search bar, by the control circuit, a listing of photographic inventories associated with the first term and available at the single retailer in response to the initial input from the customer.

14. The method of claim 10, further comprising:
receiving, at the control circuit, from the electronic device the initial input from the customer via the graphical user interface shown on the display, wherein the initial input is a confirmation from the customer to search the first term; and initiating, by the control circuit, display on the graphical user interface of one or more second terms associated with the first term, wherein the one or more second terms comprise at least one of: one or more words, one or more phrases, one or more numerical numbers, and one or more symbols that are associated with the retail product inventories.

15. The method of claim 10, further comprising:
receiving, at the control circuit, a second input from the customer through a second entry of a second term in the universal search bar by the customer, wherein the second term comprises at least one of: a city, a state, a zip code, and a country; and
initiating, by the control circuit, display on the user interface of one or more retail locations of the plurality of the retail locations, wherein the one or more retail locations are associated with the second term in the universal search bar.

16. The method of claim 15, wherein the second input may correspond to the initial input from the customer, and wherein the second entry replaces the entry of the first term.

17. The method of claim 15, further comprising:
receiving, at the control circuit, a third input from the customer through a selection of one of the one or more retail locations; and
initiating, by the control circuit, display on the user interface of information associated with the selected one of the one or more retail locations.

18. The method of claim 17, further comprising:
receiving, at the control circuit, a fourth input from the customer through a store selection on the user interface; and
in response to the receipt of the fourth input, initiating association of the information with an electronic transaction associated with the customer.

19. The universal search system of claim 1, wherein the control circuit is further configured to receive the initial input from the customer replacing the first term automatically entered in the universal search bar with a second term, wherein the second term comprises at least one of: a city, a state, a zip code, and a country.

20. The universal search system of claim 19, wherein the control circuit is further configured to:
receive the initial input from the customer replacing the first term automatically entered in the universal search bar with a second term associated with one or more retail locations of the plurality of the retail locations; and
initiate display on the user interface of the one or more retail locations.

21. The method of claim 10, further comprising:
receiving the initial input from the customer replacing the first term automatically entered in the universal search bar with a second term, wherein the second term comprises at least one of: a city, a state, a zip code, and a country; and
initiating display on the user interface of one or more retail locations associated with the second term.

* * * * *